(12) United States Patent
Ziller et al.

(10) Patent No.: US 11,260,689 B2
(45) Date of Patent: Mar. 1, 2022

(54) INTEGRALLY INJECTION MOLDED WHEEL WITH HIGH STABILITY

(71) Applicant: CIP HOLDING AG, Munich (DE)

(72) Inventors: Daniel Ziller, Crottendorf (DE); Anne Bilz, Seiffen (DE); Falk Broberg, Crottendorf ot Walthersdorf (DE); Francesco Messner, Annaberg-Buchholz (DE); Jens Suess, Crottendorf (DE); Falk Nestler, Sehmathal-Neudorf (DE); Lars Koehler, Crottendorf (DE); Juergen Burkert, Crottendorf (DE); Andreas Papenfuss, Weimar (DE); Robert Stelzer, Chemnitz (DE); Sebastian Iwan, Chemnitz (DE); Torsten Vogel, Thum-Herold (DE); Mirko Spieler, Gelenau (DE); Wolfgang Nendel, Schoenerstadt (DE)

(73) Assignee: CIP Holding AG, Munich (DE)

(*) Notice: Subject to any disclaimer, the term of this patent is extended or adjusted under 35 U.S.C. 154(b) by 603 days.

(21) Appl. No.: 16/306,743

(22) PCT Filed: May 26, 2017

(86) PCT No.: PCT/EP2017/062741
§ 371 (c)(1),
(2) Date: Dec. 3, 2018

(87) PCT Pub. No.: WO2017/207426
PCT Pub. Date: Dec. 7, 2017

(65) Prior Publication Data
US 2019/0143745 A1 May 16, 2019

(30) Foreign Application Priority Data
Jun. 3, 2016 (DE) .................. 10 2016 110 280.6

(51) Int. Cl.
*B60B 1/00* (2006.01)
*B60B 1/08* (2006.01)
(Continued)

(52) U.S. Cl.
CPC ............... *B60B 1/003* (2013.01); *B60B 1/08* (2013.01); *B60B 5/02* (2013.01); *B60B 1/0269* (2013.01);
(Continued)

(58) Field of Classification Search
CPC ....... B60B 1/003; B60B 1/0269; B60B 3/001; B60B 3/06; B60B 3/10; B60B 5/02
See application file for complete search history.

(56) References Cited

U.S. PATENT DOCUMENTS 1,386,389 A * 8/1921 Wilson ...................... B60B 5/02
152/7
4,035,895 A * 7/1977 Lester ..................... B23P 11/02
29/894.343

(Continued)

FOREIGN PATENT DOCUMENTS

| CN | 2633603 Y | 8/2004 |
| CN | 103865175 A | 6/2014 |

(Continued)

*Primary Examiner* — Jason R Bellinger
(74) *Attorney, Agent, or Firm* — Laurence A. Greenberg; Werner H. Stemer; Ralph E. Locher

(57) ABSTRACT

A stable, low-weight wheel which is particularly suitable for high system-weight bicycles, such as electrically powered bicycles and cargo bikes, includes a hub, at least three solid-body spokes disposed rotationally symmetrical to the wheel axis, and a rim. The body of the hub, spokes and rim is made in one piece by injection molding of a glass-fiber reinforced thermoplastic. The spokes have an S-shaped cross-section with an opening angle which increases in the direction of the rim, taper from the rim towards the hub in a central cross-section of the wheel, and taper from the hub towards the rim in a wheel cross-section running through the center of least one spoke. A method for producing the wheel is also provided.

19 Claims, 6 Drawing Sheets

(51) Int. Cl.
  *B60B 5/02* (2006.01)
  *B60B 1/02* (2006.01)
  *B60B 3/00* (2006.01)
  *B60B 3/06* (2006.01)

(52) U.S. Cl.
  CPC .............. *B60B 3/007* (2013.01); *B60B 3/06* (2013.01); *B60B 2310/202* (2013.01); *B60B 2310/204* (2013.01); *B60B 2900/311* (2013.01); *B60B 2900/321* (2013.01); *B60B 2900/711* (2013.01)

(56) References Cited

U.S. PATENT DOCUMENTS

| | | | |
|---|---|---|---|
| 4,523,790 A | | 6/1985 | Mariani |
| 4,930,844 A | | 6/1990 | Giroux |
| 4,995,675 A | * | 2/1991 | Tsai ........................ B60B 1/003 |
| | | | 301/104 |
| 5,061,013 A | * | 10/1991 | Hed ........................ B60B 21/025 |
| | | | 301/64.704 |
| 5,104,199 A | * | 4/1992 | Schlanger ............... B60B 1/003 |
| | | | 301/64.704 |
| 5,184,874 A | * | 2/1993 | Olson ..................... B29C 33/52 |
| | | | 301/104 |
| 5,246,275 A | | 9/1993 | Arredondo, Jr. |
| 2010/0320830 A1 | * | 12/2010 | Rider ....................... B60B 3/10 |
| | | | 301/64.101 |
| 2014/0239705 A1 | | 8/2014 | Bertrand |

FOREIGN PATENT DOCUMENTS

| | | |
|---|---|---|
| DE | 3536308 A1 | 4/1987 |
| DE | 29915952 U1 | 1/2000 |
| DE | 102010037524 B3 | 3/2012 |
| DE | 102012107692 A1 | 2/2014 |
| EP | 0754570 A1 | 1/1997 |
| EP | 1083063 A2 | 3/2001 |
| FR | 2505264 A1 | 11/1982 |
| WO | 2014099197 A1 | 6/2014 |

* cited by examiner

INTEGRALLY INJECTION MOLDED WHEEL WITH HIGH STABILITY

BACKGROUND OF THE INVENTION

Field of the Invention

The present invention relates to an extremely stable low-weight wheel, which is particularly suitable for bicycles having an increased system weight such as electrically powered bicycles and cargo bikes, and a manufacturing method thereof.

Description of the Related Art

Wheels for various types of bicycles such as mountain bikes, everyday bikes, recumbent bicycles, and the like have long been known in various embodiments and materials. With regard to the spoke construction, classic spoke wheels made of metal with a large number of spokes, but also wheels with a highly reduced number of spokes in which the spokes are designed using more material to provide for the required stability, are available. If low weight and high stability are desired, the latter wheels are usually produced by carbon construction. However, carbon construction is comparatively expensive and complex and is therefore used mainly in the sports sector. Furthermore, the stability to lateral impact loads is often insufficient if no specific countermeasures are taken.

In recent years, the use of cargo bikes, fleet bikes and electrically powered bicycles such as pedelecs and e-bikes has greatly increased, and the electric drive is particularly used in cargo bikes and fleet bicycles. Given the higher speeds of electrically powered bicycles and the increased weight of cargo bicycles, the wheels should be capable of withstanding the increased mechanical stresses involved. The above-mentioned carbon construction wheels are lightweight and stable, if carefully designed, but are costly and laborious to manufacture, as mentioned above, and can still be improved with respect to absorbing loads that are untypical of sports bikes, such as lateral impact loads.

DE 3536308 A1 discloses wheels described to be particularly suitable for wheelchairs which accordingly have a high bending strength and are also stable to torsional loads. The wheel with hub, spokes and rim is molded in one piece from plastic, wherein the spokes are hollow spokes and the spokes have defined cross-sectional dimensions and a defined cross-sectional profile. However, the stability of molded plastic wheels can still be improved.

U.S. Pat. No. 4,930,844 discloses wheels in which the hub, spokes and the rim bed are integrally molded as one piece from glass-fiber reinforced polyamide; however, in order to provide sufficient stability, they comprise a metal ring joined to the rim. The stability of the wheel made of fiber-reinforced plastic material alone is obviously insufficient.

EP 1083063 A2 discloses one-piece injection-molded wheels with an S-shaped spoke cross-section which may be glass-fiber reinforced. Further described is an increase of the cross-section of the spokes towards the hub and a widening of the S-shape towards the hub. Furthermore, the spokes are sinusoidally flanged to one another in the hub portion.

WO 2014/099197 A1 discloses methods to reduce the wind resistance of vehicle wheels, such as wheels of bicycles. For bicycle wheels, an elliptical spoke profile is disclosed.

SUMMARY OF THE INVENTION

It is an object of the present invention to provide stable wheels which withstand increased mechanical stresses as can occur especially in electrically powered bicycles and/or cargo bikes, which have an acceptable, preferably low weight and which can be inexpensively produced in large numbers with few process steps. The wheels should further be as durable as possible and should require little maintenance.

This object is solved by a wheel, which is particularly suitable for bicycles, electric bicycles and cargo bikes, and which comprises a hub, at least three solid-body spokes disposed rotationally symmetric with respect to the wheel axle, and a rim, wherein the body of hub, spokes and rim is made in one piece (integrally) by injection molding of a glass-fiber reinforced thermoplastic, characterized in that
- the spokes have an S-shaped cross-section with an opening angle which increases in the direction of the rim,
- the spokes taper from the rim towards the hub in a central cross-section of the wheel (or in a plan view in the axial direction of the wheel), and
- the spokes taper from the hub towards the rim in a wheel cross-section running through the center of least one spoke.

The present invention also provides a method for producing the wheel.

The inventors have conducted extensive research and found that, due the described specific spoke design of the wheel and the use of a suitable glass-fiber reinforced thermoplastic, a surprisingly excellent wheel stability can be obtained while the weight of the wheel can be kept low. In particular, it has been observed with respect to the stability that both a high vertical impact load is tolerated, such as experienced when riding through potholes, possibly in combination with a high system weight. Further, a high stability is achieved in the region of the hub with respect to deformation forces that occur especially when braking using disc brakes, and a high lateral stability, i.e. with respect to lateral forces on the wheel in the vicinity of the rim which may occur, for example, when cornering and in accidents. It was surprising that this combination of stability characteristics could be achieved even with a relatively small wall thickness of the spokes. The wheel according to the invention thus meets high safety requirements, which are particularly advantageous or necessary for cargo bikes, electrically operated bicycles such as pedelecs and e-bikes. In particular, the wheel according to the invention can be rapidly produced in one process step and in large quantities.

The wheel according to the invention comprises a hub, at least three solid-body spokes arranged rotationally symmetric to the wheel axle, and a rim, wherein the body of hub, spokes and rim is made in one piece by injection molding. The wheel according to the invention therefore does not require a metallic reinforcement, for example in the region of the rim, but is injection-molded completely in one piece. The arrangement of the spokes is preferably such that all spokes have the same distance from adjacent spokes. Solid-body spokes in the present invention should be understood as spokes which are not hollow spokes. However, for weight reduction, the spokes of the invention can have recesses or holes where material has been removed. The rim of the wheel according to the invention can be designed for clincher or tubular tires. The rim flange with undercut required for clincher tires can be realized in injection molding by means of sliders or mold parts having a collapsible core.

The design of the spokes with an S-shaped cross-section having an increasing opening angle in the direction of the rim is an essential feature of the present invention (see FIG. 2). The S-shaped cross-section allows a low-weight design of the spokes and contributes to the stability of the wheel. According to the invention, the term "S-shaped cross-section" also comprises S-shapes in which the peaks of the S-shape are slightly edged, as indicated in FIG. 2 b).

It is further essential according to the present invention that the spokes taper from the rim towards the hub in the central cross-section of the wheel. The "central cross-section of the wheel" is understood according to the invention as a cross-section through the entire wheel in the center thereof. The tapering can also be observed in a vertical lateral plan view in the direction of the wheel axle (see FIG. 3 a)).

Furthermore, the spokes taper from the hub towards the rim in a wheel cross-section running through the spokes. More specifically, the wheel cross-section is a section through the wheel axle perpendicular to the main plane of the wheel, the section running through the center of at least one spoke. In other words, according to the invention, the spokes widen in the direction from the rim to the hub in the direction towards the outer hub ends. The tapering in the wheel cross-section from the hub to the rim can be observed in FIG. 3 b), which shows a section along A-A in FIG. 3 a).

By combining these spoke design features, one-piece wheels with excellent stability at low weight could be provided by injection molding, without having to apply a complex carbon construction method.

The wheel according to the invention preferably has 3 to 8, more preferably 5 or 6 spokes, even more preferably exactly 6 of the described spokes. Particularly with a number of spokes of 6, excellent results were achieved in terms of stability at an acceptably low weight.

The spokes of the wheel according to the invention preferably have a wall thickness in the range of 1.5 to 5 mm, more preferably 2.5 to 3.5 mm. It is further preferred to keep the wall thickness of the spokes constant or essentially constant along the spoke. However, there can be an increase in the wall thickness of the spokes in the transition portion to the rim and/or to the hub.

To further improve the stability of the wheel, the transitions between the spokes and the rim and/or the transitions between adjacent spokes in the region of the hub are preferably designed continuously (see FIG. 3 a), dashed lines), to obtain smooth transitions of the spokes to the rim. In the region of the hub, such continuous transitions can also be referred to as bridges between adjacent spokes.

The wheel according to the invention is produced using a glass-fiber reinforced thermoplastic. The glass-fiber reinforced thermoplastic preferably comprises a glass-fiber content of 35 to 65 wt.-%, more preferably 40 to 60 wt.-%, more preferably 45 to 55% by weight. The glass-fibers are preferably so-called long fibers with a length of more than 1 mm. Within the aforementioned ranges of amounts, on the one hand good mechanical properties of the wheel can be provided, and on the other hand a processing by injection molding is possible, even with the formation of finer shapes, such as of the rim design. It is preferred in the present invention, when the fibers in the end product after injection molding are tangled and are largely not having the same orientation.

As a thermoplastic matrix, in particular polyamides, copolyamides and mixtures thereof can be considered. Plastic matrices based on partially crystalline polyamides and partially aromatic polyamides are preferred. Examples of suitable polyamides and copolyamides are polyamide 6, polyamide 66, polyamide 6I, polyamide 6X, polyamide 6I/X and in particular mixtures thereof, such as polyamide 66 in combination with polyamide 6I/X.

According to the invention, the glass-fiber reinforced thermoplastics preferably have a tensile stress at break according to DIN EN ISO 527 of 100 MPa to 300 MPa, preferably 150 MPa to 250 MPa, and an E modulus according to DIN EN ISO 527 of 6 GPa to 30 GPa, preferably 15 GPa to 25 GPa.

Suitable glass-fiber reinforced thermoplastics are commercially available, for example under the trade name Grivory® from EMS-Grivory, EMS Chemie AG, Switzerland.

In other preferred embodiments, a reflective pigment can be admixed to the glass-fiber reinforced thermoplastic to improve visibility, whereby a reflective wheel is obtained after extruding and injection molding.

In preferred embodiments of the invention, the wheel comprises a metal insert or plastic insert in the hub for holding an axle, an electric motor (hub motor), a hub dynamo and/or an internal gear hub; or a wheel bearing is, for example, directly pressed into the plastic body of the wheel. The production of the wheel according to the invention by injection molding allows to readily provide such an insert or wheel bearing in the wheel hub. For example, incorporating the corresponding component can be effected by inserting the same in the mold and injection molding around the same, or the respective component is joined or compressed with the wheel after injection molding, preferably utilizing the residual heat of the injection molded wheel.

Further, with regard to weight saving, the wheel according to the invention preferably has a rim design in which the rim has an at least partially open hollow profile in the outward radial direction (see FIG. 5 b)). The hollow profile can be configured as a V-shaped, U-shaped, trapezoidally shaped or box-shaped profile. The profile depth may preferably be 1 to 80 mm, more preferably 15 to 50 mm, also preferably 25 to 35 mm.

The hollow profile can be completely open, or it can be interrupted by transverse ribs which divide the hollow profile into chambers, in order to increase the stability (FIG. 6). The hollow profile and the hollow profile interrupted by transverse ribs can be formed by radially extracting cavity-forming mold parts during injection molding.

The transverse ribs preferably have a thickness of 1 mm to 6 mm in the center of the ribs, more preferably of 1.5 to 4 mm, more preferably 2 to 3 mm, measured at the outer rib edge. Furthermore, it is preferred that the transverse ribs have a continuous transition into the rim sides.

The wheel according to the invention can be provided with a rim tape, in particular when constructed for use with clincher tires. The rim tape preferably rests on the hollow profile or on the hollow profile interrupted by transverse ribs and supports the inner tube against the tire pressure.

The rim tape is preferably formed from thermoplastic continuous fiber-reinforced composite materials (textile-reinforced semi-finished products with thermoplastic matrix) and furthermore preferably has a tensile stress at break according to DIN EN ISO 527 in the range of 200 to 600 MPa, more preferably 300 to 400 MPa, and preferably has an E modulus according to DIN EN ISO 527 in the range of 6 GPa to 30 GPa, more preferably 15 GPa to 25 GPa. The thickness of the rim tape may preferably be 0.25 to 5 mm, more preferably 0.3 to 1 mm, further preferably 0.4 to 0.6 mm.

Particularly preferred are embodiments in which the transverse ribs partitioning the rim profile re classified into segments, wherein the ribs each have the same radial orientation within the segments, i.e. extend parallel to one another, and in which the ribs in adjacent segments have different radial orientations but are also aligned parallel to each other within the same segment (FIG. 6). Surprisingly, a further improvement in stability could be achieved as compared to the case where all transverse ribs had the same orientation. The wheel according to the invention further preferably comprises 6 to 12 of these segments, more preferably 8 segments. According to the invention, a wheel with 6 spokes and 8 segments which resulted in a particularly good combination of stability and low weight, is particularly preferred.

The wheels according to the invention can be produced with in any conventional dimensions and rim dimensions for bicycles and cargo bikes as specified for example by the ETRTO (European Tire and Rim Technical Organization). Based on the ETRTO specifications, preferred nominal wheel diameters are those suitable for tire dimensions of 16 to 28 inches, more preferably 18 to 26, further preferably 20 to 26 inches, most preferably 24 inches. The rim widths (mouth width) are preferably 14 to 35 mm, more preferably 25 to 30 mm. In the case of clincher tires, the rim edge heights are preferably in the range of 5 to 10 mm, more preferably from 6 to 8 mm.

In case of a size for 24 inch tires, the wheels according to the invention preferably have a weight in the range of 1 to 2 kg, more preferably 1 to 1.5, more preferably 1 to 1.2 kg, depending on the desired stability. The weight refers to the weight of the wheel after injection molding without the above-described optional inserts in the hub portion.

The wheels according to the invention can be used not only for two-wheeled vehicles, but also for three- or four-wheeled vehicles. Areas of application of the inventive wheels are in particular e-bikes, cargo bikes, fleet wheels, pedelecs, mountain bikes, recumbent bikes or wheelchairs, but also vehicles not driven by muscle power such as motor scooters (scooters). Due to the good combination of weight and stability, the wheels according to the invention are particularly preferably to be used for two- or three-wheeled cargo bikes and electrically powered bicycles such as e-bikes or pedelecs. The wheel applications according to the invention particularly also include vehicles powered by mid-engines and four-wheel drive vehicles in which a hub motor is provided in each wheel hub.

The wheels of the present invention, comprising a hub, at least three solid-body spokes arranged rotationally symmetric with respect to the wheel axle, and a rim, are integrally formed by injection molding using a suitable thermoplastic glass-fiber reinforced plastic. To this end, the thermoplastic glass-fiber reinforced plastic is usually processed in an extruder and brought to a suitable temperature and is then injected into the mold. Subsequently, the main mold parts are usually removed in the axial direction of the wheel. The S-shaped cross-sectional shape of the spokes and their design as a solid-body allowed a simple and undercut-free molding. Any optionally desired hollow profile shape of the rim, including any optional transverse ribs, can be obtained by using suitable mold parts or sliders which are pulled out radially after injection molding.

If a wheel bearing or a metal insert or plastic insert for holding an axle-bearing and/or an electric motor are to be provided in the hub opening, the respective component can be arranged in advance in the mold during injection molding and injection molding occurs around the component, or it is pressed in the hub opening after injection-molding, preferably making use of the residual heat of the injection molded part.

BRIEF DESCRIPTION OF THE SEVERAL VIEWS OF THE DRAWING

The present invention will be described below in more detail with reference to the accompanying drawings.

FIG. 2 a) shows a part of a wheel according to the invention and FIG. 2b) shows a more detailed representation of a spoke with emphasized cross-sections which correspond to the positions of the dashed lines in FIG. 2 a).

FIG. 3 b) shows the tapering of the spoke from the hub to the rim in a wheel cross-section.

FIG. 4 b) schematically shows an example of a design of the hub portion according to the invention with an inserted insert for an axle-bearing, wherein the lower part of FIG. 4 b) shows a cross-section of the hub portion along the line B-B.

DESCRIPTION OF THE INVENTION

Embodiments of the wheel of the present invention are described in more detail below with reference to the attached drawings.

Figure 1:
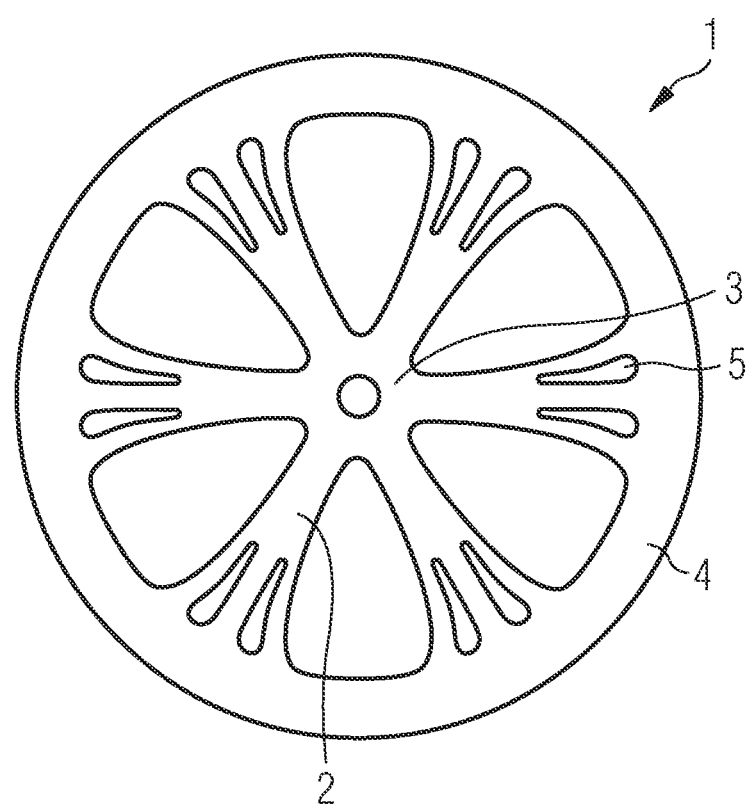
FIG. 1 shows a plan view from the side of a wheel according to the invention having six spokes.

A wheel 1 as shown in FIG. 1 having six S-shaped spokes 2, a hub 3 and a rim 4 was produced in one piece by injection molding of a suitable glass-fiber reinforced thermoplastic having a glass-fiber content of 50% (e.g. Grivory® GVN-5H 9915) into a suitable injection mold and removing the mold in the direction of the wheel axle. The wheel can be formed with a rim designed for a clincher tire including a tube or with a tubular tire rim. In the embodiment shown in FIG. 1, the spokes comprise holes 5 for weight reduction.

Figure 2B:
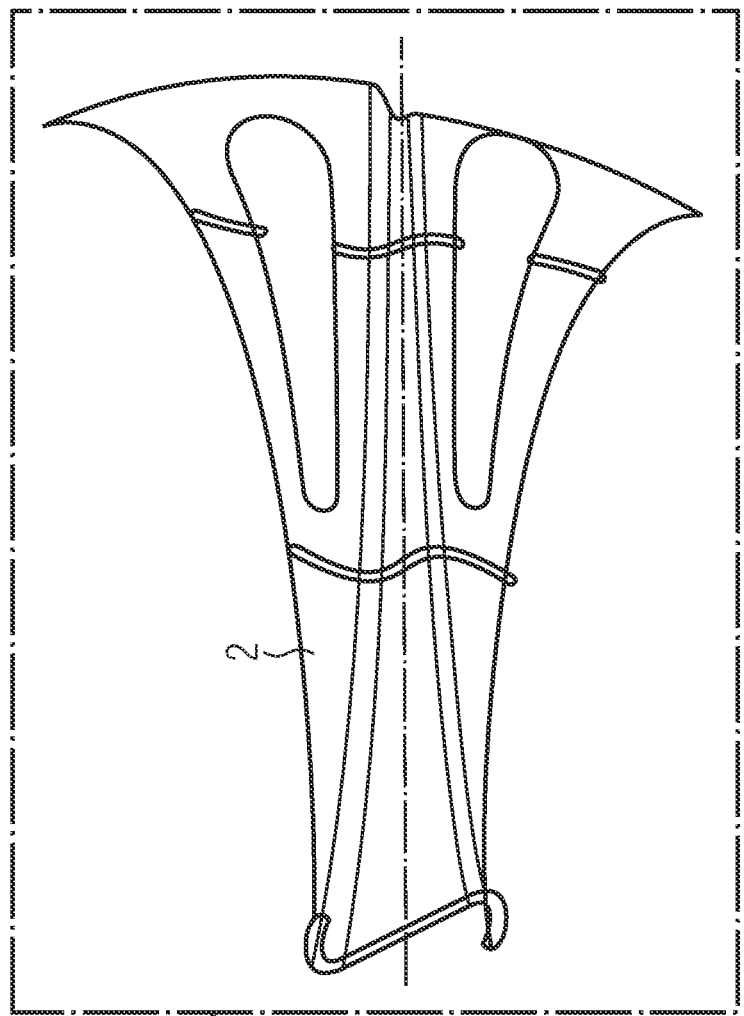
FIG. 2 illustrates the S-shaped cross-sectional profile of the spokes.
Figure 2A:
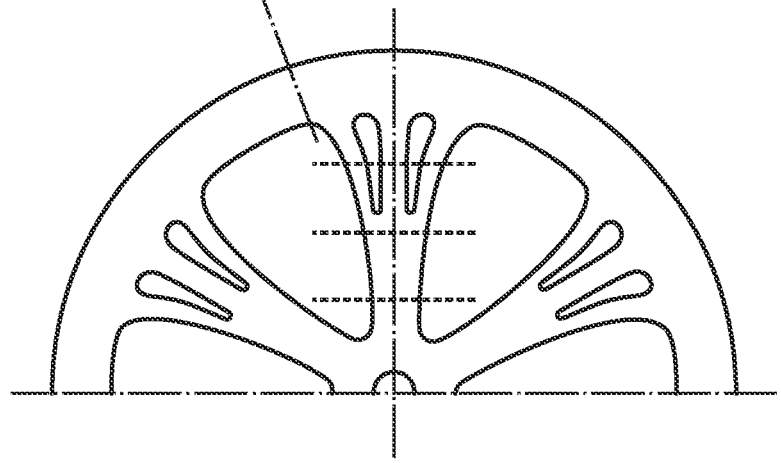
Figure 3A:
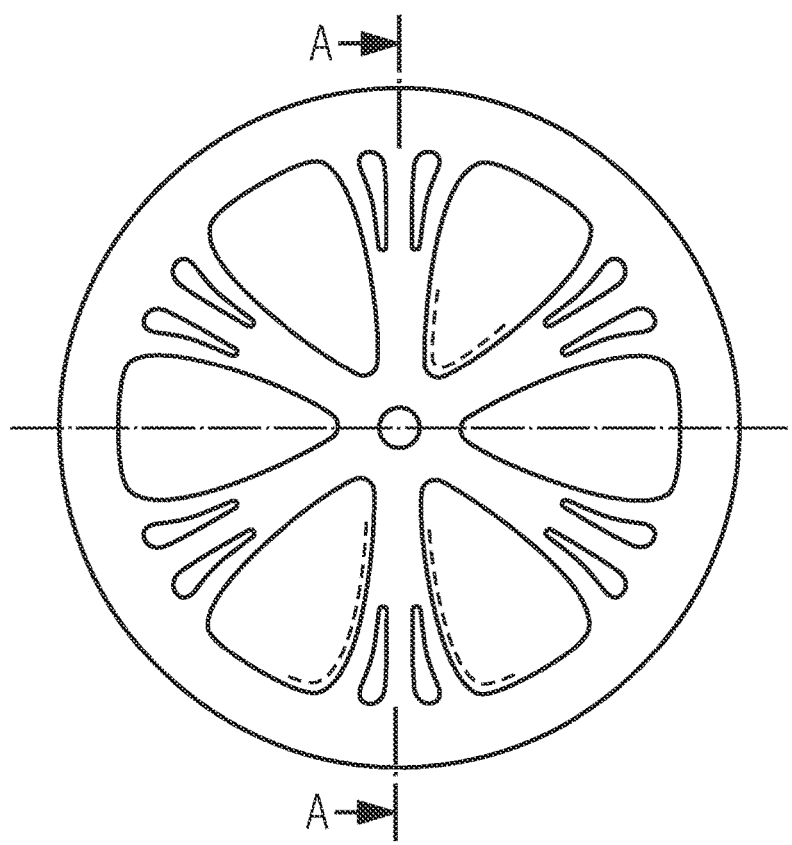
FIG. 3 a) shows a plan view of a wheel according to the invention in the direction of the axle, wherein the tapering of the spokes from the rim towards the hub can be seen.
Figure 3B:
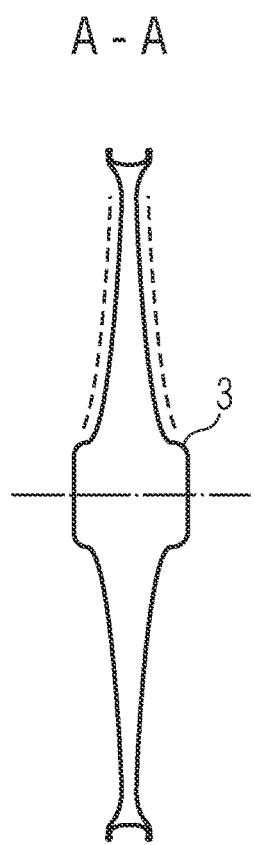

The spokes 2 have an S-shaped cross-section with an opening angle which increases in the direction of the rim (see FIG. 2, in particular FIG. 2b)). The wall thickness in this embodiment is about 3 mm and is largely constant from the hub to the rim. The spokes 2 taper from the rim 4 towards the hub 3 in a central cross-section of the wheel (FIG. 3 a)), and taper from the hub 3 towards the rim 4 in a wheel cross-section running centrally through at least one spoke 2 (see FIG. 3 b)). Between the spokes 2 in the portion of the hub 3 and the transition portion from spokes 2 to the rim 4, the spokes 2 are continuous. These transitions are indicated in FIG. 3a by dashed lines.

Figure 4B:
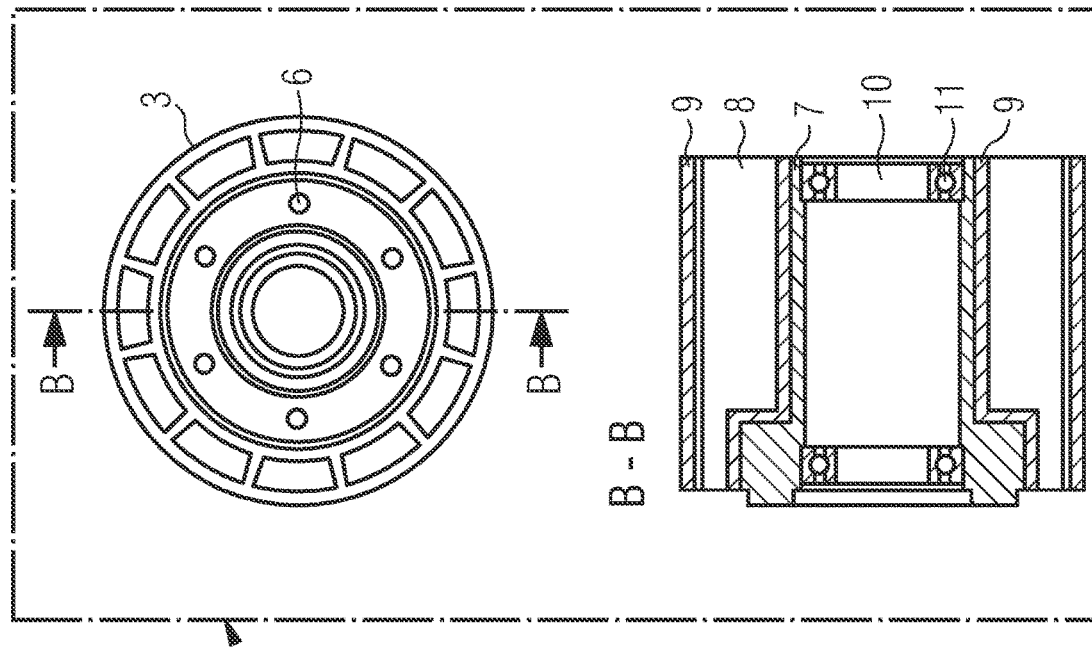
FIG. 4 a) shows a plan view of a wheel according to the invention in axial direction.
Figure 4A:
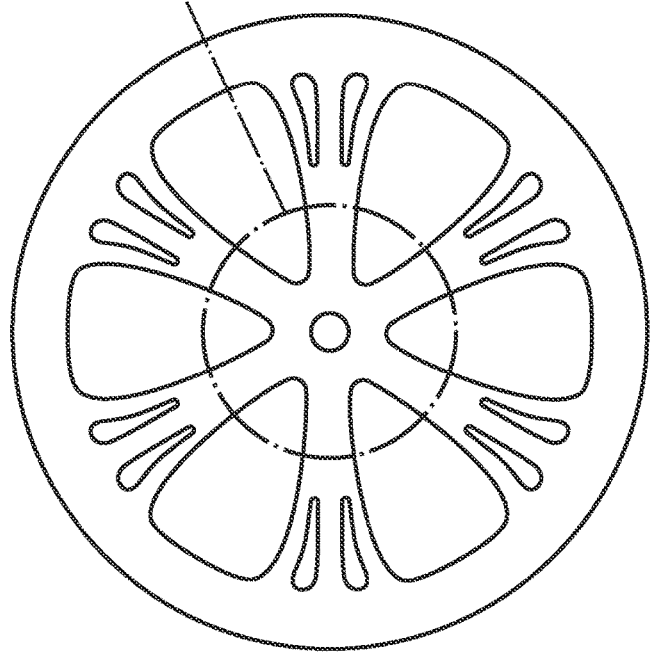

FIG. 4 b) shows a possible embodiment of the hub 3 of the wheel according to the invention, comprising an insert for holding the wheel axle. The hub portion 3 is provided with mounting holes or bores 6 for mounting a brake disc. In the cross-section along the line B-B, the insert which is formed of a cylindrical support 7 having integrated ball bearings 11 can be observed. The insert is fixedly inserted in the wheel 3 and serves to hold the wheel axle which extends through the opening 10. The walls 9 of the injection-molded wheel enclose a cavity 8 provided for weight reduction. In the present example, the wall 9, which is in contact with the insert, is step-shaped for better anchoring of the insert in the wheel hub.

Any other configurations of the hub portion 3 and the insert are possible according to the invention. In particular, an electric motor can be provided in the hub portion.

Figure 5B:
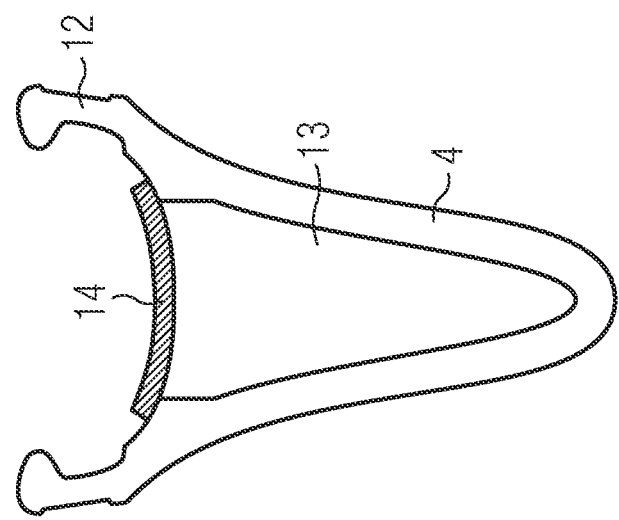
FIG. 5 a) shows a plan view of a wheel according to the invention in axial direction and FIG. 5 b) shows a possible rim profile shape as a cross-section along the line D-D of FIG. 5 a).
Figure 5A:
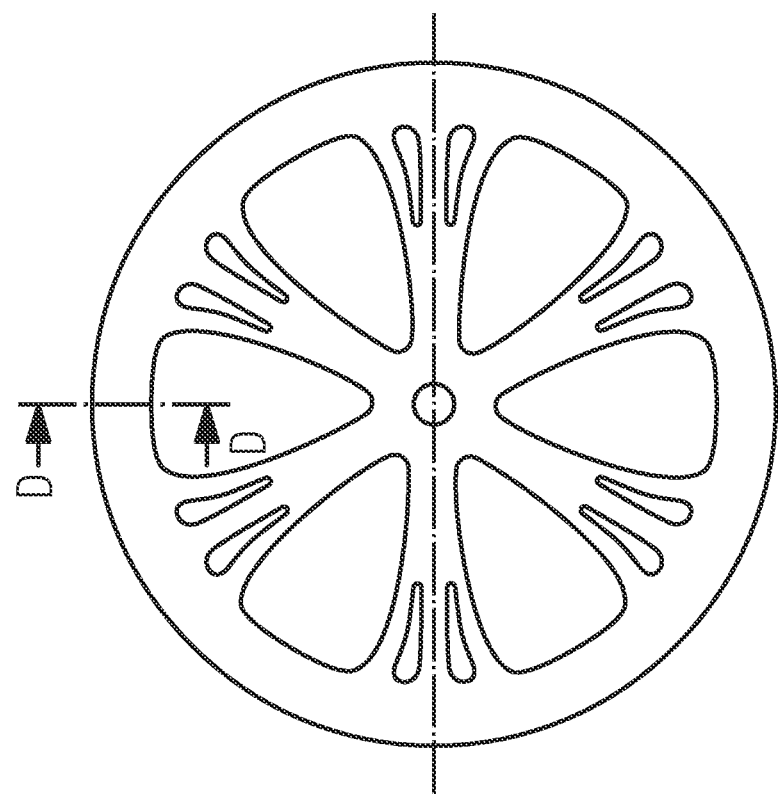

FIG. 5 shows a possible design of the rim profile of the wheel according to the invention. FIG. 5 b) shows a cross-section along the line D-D of FIG. 5 a). The rim 4 is designed with a continuous cavity 13. In the upper region of the rim 4, the rim edge 12 is shown. Furthermore, a rim tape 14 is provided in this embodiment to provide a boundary against the pressure of the tire tube.

Figure 6:
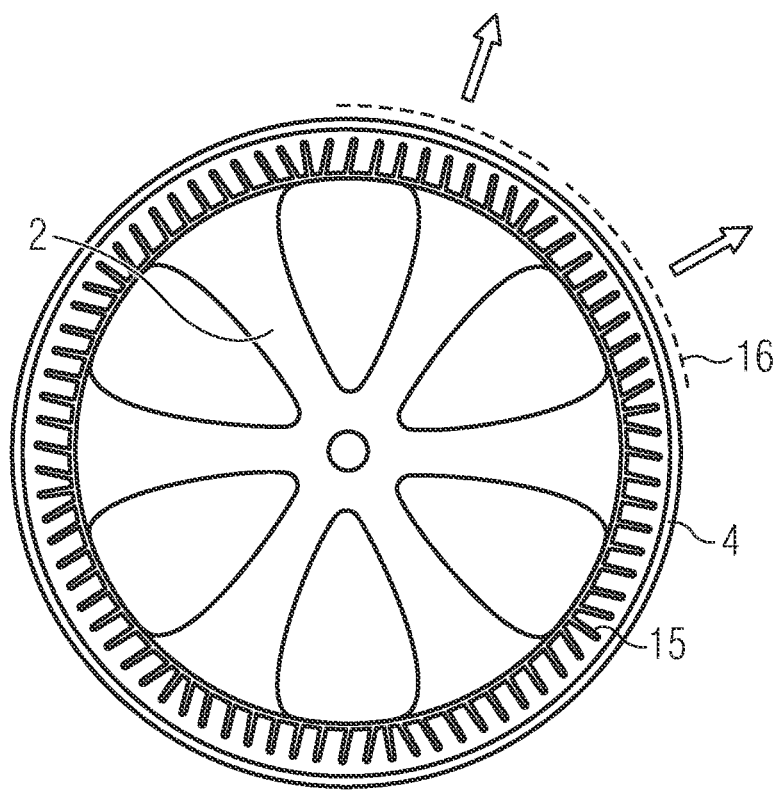
FIG. 6 shows in particular the rim portion of a wheel according to the invention having hollow chambers formed by transverse ribs in an embodiment with eight segments, in which the transverse ribs are aligned parallel to one another.

As shown in FIG. 6, the cavity 13 of the rim profile can be by divided by transverse ribs 15 to divide the cavity 13 into chambers. In the preferred embodiment shown in FIG. 6, the rim portion 4 is formed by transverse ribs 15 as a partitioned hollow profile and has eight segments 16. Within these segments 16, the transverse ribs have the same orientation, while the orientation of the transverse ribs 15 in the adjacent segments is different, respectively. The individual segments 16 can be formed when producing the wheel by providing and extracting eight radially arranged sliders.

LIST OF REFERENCE NUMBERS 1 wheel
2 spoke
3 hub, hub portion
4 rim
5 holes
5 hole
6 fixing hole, bore
7 support
8 cavity
9 wall
10 opening for axle mounting
11 ball-bearing
12 rim edge
13 rim cavity
14 rim tape
15 transverse rib
16 segment

The invention claimed is:

1. A wheel, comprising:
a one-piece glass-fiber reinforced thermoplastic injection-molded body;
said one-piece body being formed of a hub, a rim and at least three solid-body spokes disposed rotationally symmetrical to a wheel axle;
said spokes having an S-shaped cross-section with an opening angle increasing in a direction of said rim;
said spokes tapering from said rim towards said hub in a central cross-section of the wheel; and
said spokes tapering from said hub towards said rim in a wheel cross-section running through a center of least one of said spokes.

2. The wheel according to claim 1, wherein the wheel is an electric bicycle or cargo bike wheel.

3. The wheel according to claim 1, wherein said spokes include 3 to 8 spokes.

4. The wheel according to claim 1, wherein said spokes include 5 or 6 spokes.

5. The wheel according to claim 1, wherein said spokes have a wall thickness in a range of from 1.5 to 5 mm.

6. The wheel according to claim 1, wherein said spokes have a wall thickness in a range of from 2.5 to 3.5 mm.

7. The wheel according to claim 1, which further comprises continuous transitions at least at one of between said spokes and said rim or between adjacent spokes at said hub.

8. The wheel according to claim 1, wherein said hub includes a metal insert or a plastic insert for holding at least one of an axle, an electric motor, a hub dynamo or an internal gear hub, or a wheel bearing is pressed directly into said thermoplastic body.

9. The wheel according to claim 1, wherein said rim has an at least partially open hollow profile extended outwardly in a radial direction.

10. The wheel according to claim 9, wherein said hollow profile of said rim includes transverse ribs partitioning said hollow profile into chambers.

11. The wheel according to claim 10, wherein said ribs are divided into 6 to 12 segments, said ribs within a segment each have an identical radial orientation, and said ribs in adjacent segments have different radial orientations.

12. The wheel according to claim 1, wherein said glass-fiber reinforced thermoplastic has a glass-fiber content of 35 to 65% by weight.

13. The wheel according to claim 1, wherein said glass-fiber-reinforced thermoplastic has a tensile stress at break of 100 MPa to 300 MPa, and an E modulus of 6 GPa to 30 GPa.

14. The wheel according to claim 1, wherein said glass-fiber-reinforced thermoplastic has a tensile stress at break of 150 MPa to 250 MPa, and an E modulus of 15 GPa to 25 GPa.

15. The wheel according to claim 1, wherein said glass-fiber-reinforced thermoplastic is composed of partially crystalline polyamide and partially aromatic polyamide.

16. The wheel according to claim 1, which further comprises at least one reflective pigment.

17. A method for producing a wheel, the method comprising the following steps:
injection molding a glass-fiber reinforced thermoplastic to form a one-piece body including a hub, a rim and at least three solid-body spokes disposed rotationally symmetrical to a wheel axis;
providing the spokes with an S-shaped cross-section having an opening angle increasing in direction of the rim;
tapering the spokes from the rim towards the hub in a central cross-section of the wheel; and
tapering the spokes from the hub towards the rim in a wheel cross-section running through a center of least one of the spokes.

18. The method according to claim 17, which further comprises introducing a wheel bearing or introducing a metal or plastic insert in an opening in the hub for holding at least one of an axle bearing or an electric motor.

19. The method according to claim 18, which further comprises carrying out the step of introducing the wheel bearing or the insert by injection-molding around the wheel bearing or the insert, or joining the wheel bearing or the insert with the hub by utilizing residual heat of the injection-molded hub.

* * * * *